US009082452B2

(12) United States Patent
Lou et al.

(10) Patent No.: US 9,082,452 B2
(45) Date of Patent: *Jul. 14, 2015

(54) METHOD FOR MEDIA RELIVING ON DEMAND

(75) Inventors: Jiebo Lou, Pittsford, NY (US); Dhiraj Joshi, Rochester, NY (US); Peter O. Stubler, Rochester, NY (US); Madirakshi Das, Penfield, NY (US); Phoury Lei, Rochester, NY (US); Vivek Kumar Singh, Irvine, CA (US)

(73) Assignee: Kodak Alaris Inc., Rochester, NY (US)

( * ) Notice: Subject to any disclaimer, the term of this patent is extended or adjusted under 35 U.S.C. 154(b) by 164 days.

This patent is subject to a terminal disclaimer.

(21) Appl. No.: 13/031,343

(22) Filed: Feb. 21, 2011

(65) Prior Publication Data

US 2012/0213497 A1    Aug. 23, 2012

(51) Int. Cl.
H04N 5/783    (2006.01)
G11B 27/00    (2006.01)
G06F 17/30    (2006.01)

(52) U.S. Cl.
CPC .......... *G11B 27/00* (2013.01); *G06F 17/30044* (2013.01); *G06F 17/30047* (2013.01)

(58) Field of Classification Search
USPC .......................................... 386/342, E05.028
See application file for complete search history.

(56) References Cited

U.S. PATENT DOCUMENTS

| 6,606,411 | B1 | 8/2003 | Loui |
| 2004/0046784 | A1* | 3/2004 | Shen et al. .................... 345/733 |
| 2006/0277454 | A1* | 12/2006 | Chen .......................... 715/500.1 |
| 2008/0062141 | A1* | 3/2008 | Chandhri ....................... 345/173 |
| 2008/0256487 | A1* | 10/2008 | Kim et al. ..................... 715/810 |
| 2008/0320046 | A1* | 12/2008 | Watabe et al. ............. 707/104.1 |
| 2009/0216435 | A1 | 8/2009 | Zheng et al. |
| 2010/0124378 | A1 | 5/2010 | Das et al. |
| 2011/0115943 | A1* | 5/2011 | Sassa ......................... 348/231.5 |

FOREIGN PATENT DOCUMENTS

EP    2402867    1/2012

OTHER PUBLICATIONS

Jiang, Loui, and Cerosaletti, "Automatic aesthetic value assessment in photographic images," in the proceedings of the 2010 IEEE International Conference on Multimedia and Expo (ICME).

Paul Viola and Michael Jones, "Rapid Object Detection using a Boosted Cascade of Simple Features", Proceedings of the International Conference on Computer Vision and Pattern Recognition, 2001.

(Continued)

*Primary Examiner* — Hung Dang
*Assistant Examiner* — Girumsew Wendmagegn
(74) *Attorney, Agent, or Firm* — Hogan Lovells US LLP

(57) ABSTRACT

A method for viewing a collection of images or videos, includes analyzing the collection to determine properties of the images or videos and using the determined properties to produce icons corresponding to such properties; providing a time-varying display of the images or videos in the collection following an ordering of the images or videos in the collection and at least one of the corresponding icons; receiving a user selection of an icon; and changing the display of the images or videos in the collection following a reordering of the images or videos in the collection in response to the user selection.

11 Claims, 9 Drawing Sheets

(56) References Cited

OTHER PUBLICATIONS

He, Yan, Hu, Niyogi and Zhang, "Face recognition using Laplacianfaces", IEEE Transactions on Pattern Analysis and Machine Intelligence, 27(3), 2005.

Cao, Luo, Gallagher, Jin, Han, Huang, "A Worldwide Tourism Recommendation System Based on Geotagged Web Photos", Proceedings of the IEEE International Conference on Acoustics, Speech, and Signal Processing, 2010.

* cited by examiner

METHOD FOR MEDIA RELIVING ON DEMAND

CROSS REFERENCE TO RELATED APPLICATION

Reference is made to commonly assigned, co-pending U.S. patent application Ser. No. 13/031,347, filed concurrently herewith, entitled: "Method for Media Reliving Playback", by Jiebo Luo et al., which is incorporated herein by reference.

FIELD OF THE INVENTION

The present invention relates generally to sharing photo and video collections, and particularly to a time-varying presentation of photos and videos in response to real-time user requests.

BACKGROUND OF THE INVENTION

Pictures and videos are not taken only to record memory. There is an increasing recognition and emphasis on a media sharing and rich reliving experience. There have been many attempts to enable and empower media sharing and browsing.

Popular commercial photo and video management systems have recently started to leverage spatial, temporal, and social cues for image and video organization and browsing. For example, Apple iPhoto and Google Picasa extract global positioning system (GPS) information whenever available and display photos and videos on a map. Although with iPhoto users can configure events that will serve as their basic browsing units, Google Picasa permits users to choose from a flat list view (using years as separators) and a tree view of their pictures. One of the prized additions to both Apple iPhoto and Google Picasa is the ability to detect, extract, group and label faces with a certain amount of user interaction. With respect to browsing, both iPhoto and Picasa permit individual browsing as well as a slide-show option. In addition iPhoto has a skimming option wherein a user can mouse-over an event causing the thumbnail to cycle through the contents of the particular event. Both iPhoto and Picasa permit picture and video tagging and geo-tagging. As an alternative way of browsing Google has proposed Swirl that enables hierarchical browsing of collections. Images are clustered by appearance and content into groups hierarchically.

There is an inherent "intent gap" in providing a browsing or reliving experience to different receivers because it is difficult for current computer systems to know what each receiver likes to see. There is also a practical "semantic gap" in using current computer systems to analyze the semantic content of the images or videos in a media collection. Another aspect that has not been recognized or addressed by the current systems mentioned above is the need to consider the receiver's need in one's diverse social networks that contain busy people always on the run with different interests.

SUMMARY OF THE INVENTION

The present invention represents a method for viewing a collection of images or videos, comprising:

(a) analyzing the collection to determine properties of the images or videos and using the determined properties to produce icons corresponding to such properties;

(b) providing a time-varying display of the images or videos in the collection following an ordering of the images or videos in the collection and at least one of the corresponding icons;

(c) receiving a user selection of an icon; and (d) changing the time-varying display of the images or videos in the collection following a reordering of the images or videos in the collection in response to the user selection.

It is an advantage of the present invention to redefine sharing and reliving as a function of the receiving person's needs in an attempt to overcome both "semantic gap" and "intent gap" by including a user in the loop. A plurality of robust semantic understanding technologies are selected to facilitate author-based story-telling as well as receiver-based customization. An advantage of the present invention is to provide a receiver the ability to redirect the flow of the media reliving experience along multiple dimensions at will. In contrast, alternatives are standard slideshows, or a system that requires users to provide labor intensive media annotation for this same purpose.

It has the additional advantage that reliving are achieved using a plurality of intuitive dimensions reliably extracted from photo and video content and meta-data. In the present invention, the three dimensions of who-when-where serve as axes or guides for viewers to relive using photo and video collections.

DETAILED DESCRIPTION OF THE INVENTION

Figure 1:
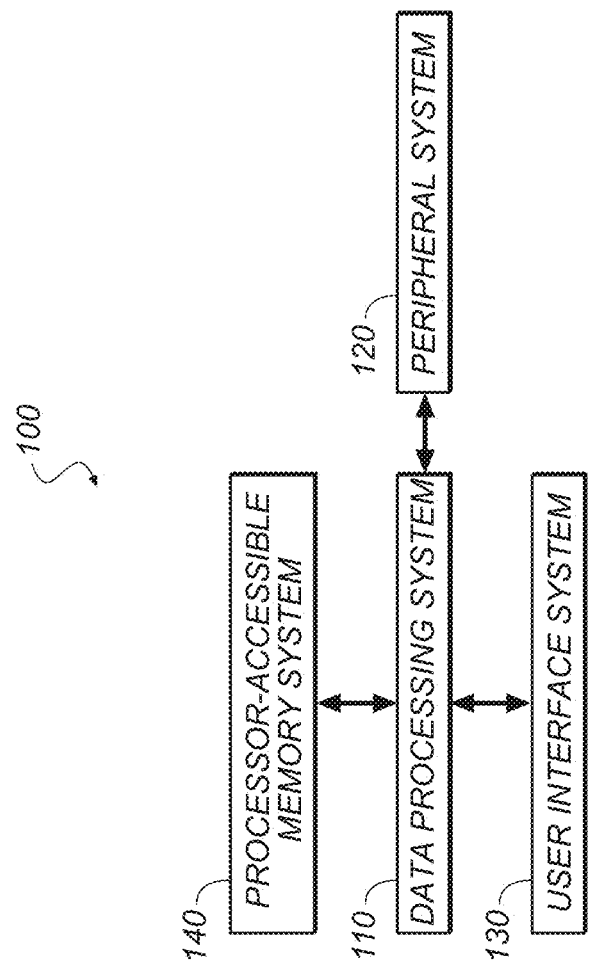
FIG. 1 is a block diagram of a system that will be used to practice an embodiment of the present invention.

FIG. 1 illustrates a system 100 for media reliving and browsing, according to an embodiment of the present invention. The system 100 includes a data processing system 110, a peripheral system 120, a user interface system 130, and a processor-accessible memory system 140. The processor-accessible memory system 140, the peripheral system 120, and the user interface system 130 are communicatively connected to the data processing system 110.

Figure 2:
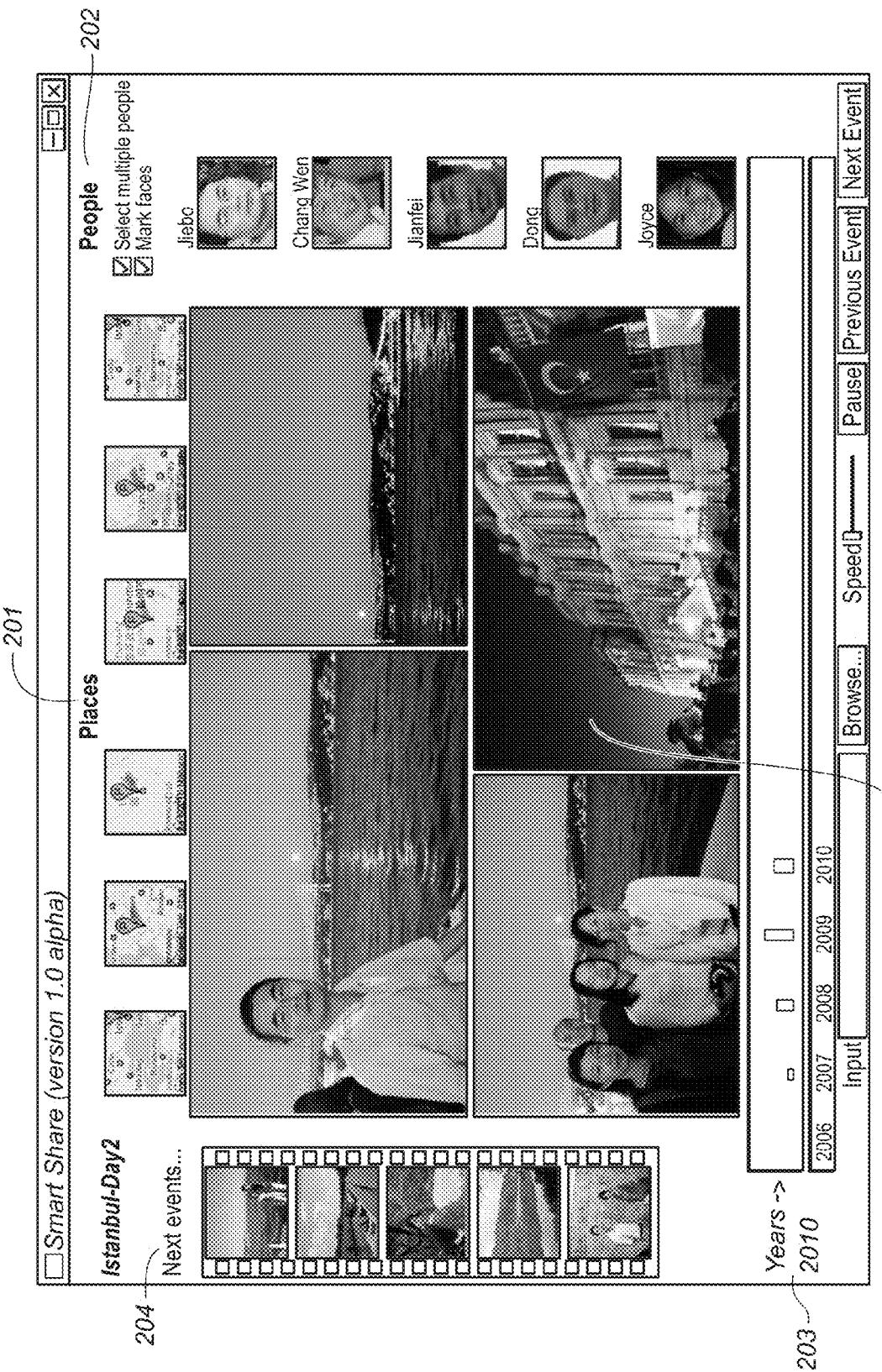
FIG. 2 is a pictorial illustration of an interface of the present invention.

The data processing system 110 includes one or more data processing devices that implement the processes of the various embodiments of the present invention, including the example process of FIG. 2. The phrases "data processing device" or "data processor" are intended to include any data processing device, such as a central processing unit ("CPU"), a desktop computer, a laptop computer, a mainframe computer, a personal digital assistant, a Blackberry™, a digital camera, a cellular phone, or any other device or component thereof for processing data, managing data, or handling data, whether implemented with electrical, magnetic, optical, biological components, or otherwise.

The processor-accessible memory system 140 includes one or more processor-accessible memories configured to store information, including the information needed to execute the processes of the various embodiments of the present invention. The processor-accessible memory system 140 is a distributed processor-accessible memory system including multiple processor-accessible memories communicatively connected to the data processing system 110 via a plurality of computers or devices. On the other hand, the processor-accessible memory system 140 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data is communicated. Further, the phrase "communicatively connected" is intended to include a connection between devices or programs within a single data processor, a connection between devices or programs located in different data processors, and a connection between devices not located in data processors. In this regard, although the processor-accessible memory system 140 is shown separately from the data processing system 110, one skilled in the art will appreciate that the processor-accessible memory system 140 is stored completely or partially within the data processing system 110. Further in this regard, although the peripheral system 120 and the user interface system 130 are shown separately from the data processing system 110, one skilled in the art will appreciate that one or both of such systems are stored completely or partially within the data processing system 110.

The peripheral system 120 can include one or more devices configured to provide digital images to the data processing system 110. For example, the peripheral system 120 can include digital video cameras, cellular phones, regular digital cameras, or other data processors. The data processing system 110, upon receipt of digital content records from a device in the peripheral system 120, can store such digital content records in the processor-accessible memory system 140.

The user interface system 130 can include a mouse, a keyboard, another computer, or any device or combination of devices from which data is input to the data processing system 110. In this regard, although the peripheral system 120 is shown separately from the user interface system 130, the peripheral system 120 is included as part of the user interface system 130.

The user interface system 130 also can include a display device, an audio output device such as speakers, a processor-accessible memory, or any device or combination of devices to which data is output by the data processing system 110. In this regard, if the user interface system 130 includes a processor-accessible memory, such memory are part of the processor-accessible \memory system 140 even though the user interface system 130 and the processor-accessible memory system 140 are shown separately in FIG. 1.

The present invention builds an automatic system using the above mentioned processor to address the photo sharing problem mentioned in the background section, i.e., organizing individual collections of images or videos captured for the same event by different cameras into a master collection.

The phrase, "digital content record", as used herein, refers to any digital content record, such as a digital still image, a digital audio file, or a digital video file, or a frame of a digital video. The phrase, "media stream", as used herein, refers to any sequence of a plurality of digital content records, such as digital still images, digital audio files or digital video files.

Referring to FIG. 2, there is shown a pictorial illustration of an interface of the present invention. One or more images or videos are displayed in a center media display area 200 of the display. A plurality of navigation tool bars are provided to enable a viewer to redirect the flow of the time varying display of images or videos, including a "places" navigation tool bar 201, a "people" navigation tool bar 202, a "time" navigation tool bar 203, and an "event" navigation tool bar 204. Each navigation tool bar 201, 202, 203, 204 can contain zero, one, or multiple icons indicating what options are available to the viewer for that tool bar. For example, multiple maps are shown to indicate to the viewer the places where images or videos have been taken, multiple face images are shown to indicate the people who are present in the images or videos in the media collection, multiple bars of various heights are shown to indicate the years and months when images or videos have been taken, and multiple thumbnail images are shown to indicate multiple events that are related to the viewers current request.

Figure 3:
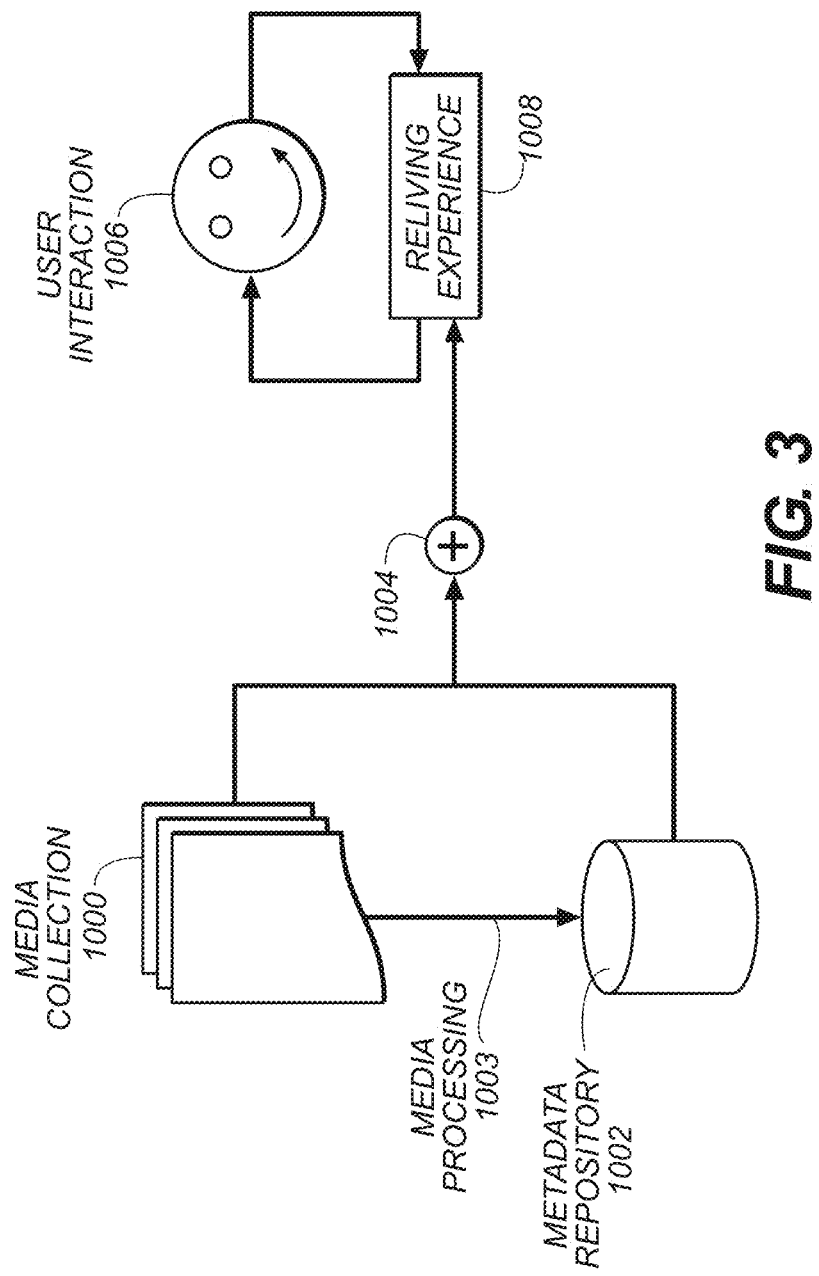
FIG. 3 is a block diagram of steps involved in the media processing component of the present invention.

FIG. 3 shows the building components of the present invention and their interaction. Media collection 1000 is a media collection of pictures or videos from personal, family, or friends' sources. Metadata repository 1002 is a database repository of descriptive metadata, or properties, obtained from the media collection 1000. In an embodiment of the present invention, properties including "places", "people", "time", and "events" are examples of the metadata in the metadata repository 1002. They are presented as icons on the corresponding navigation tool bars 201, 202, 203, 204. A media processing component 1003, a process of producing metadata from the media collection 1000, is described in more detail in FIG. 4. A reliving experience component 1008 involves a combination component 1004 of media collection 1000, metadata repository 1002, and a user interaction component 1006. The media collection 1000 is displayed in a time-varying fashion to the user although the metadata repository 1002 and user interaction component 1006 drive the reliving experience component 1008.

Figure 4:
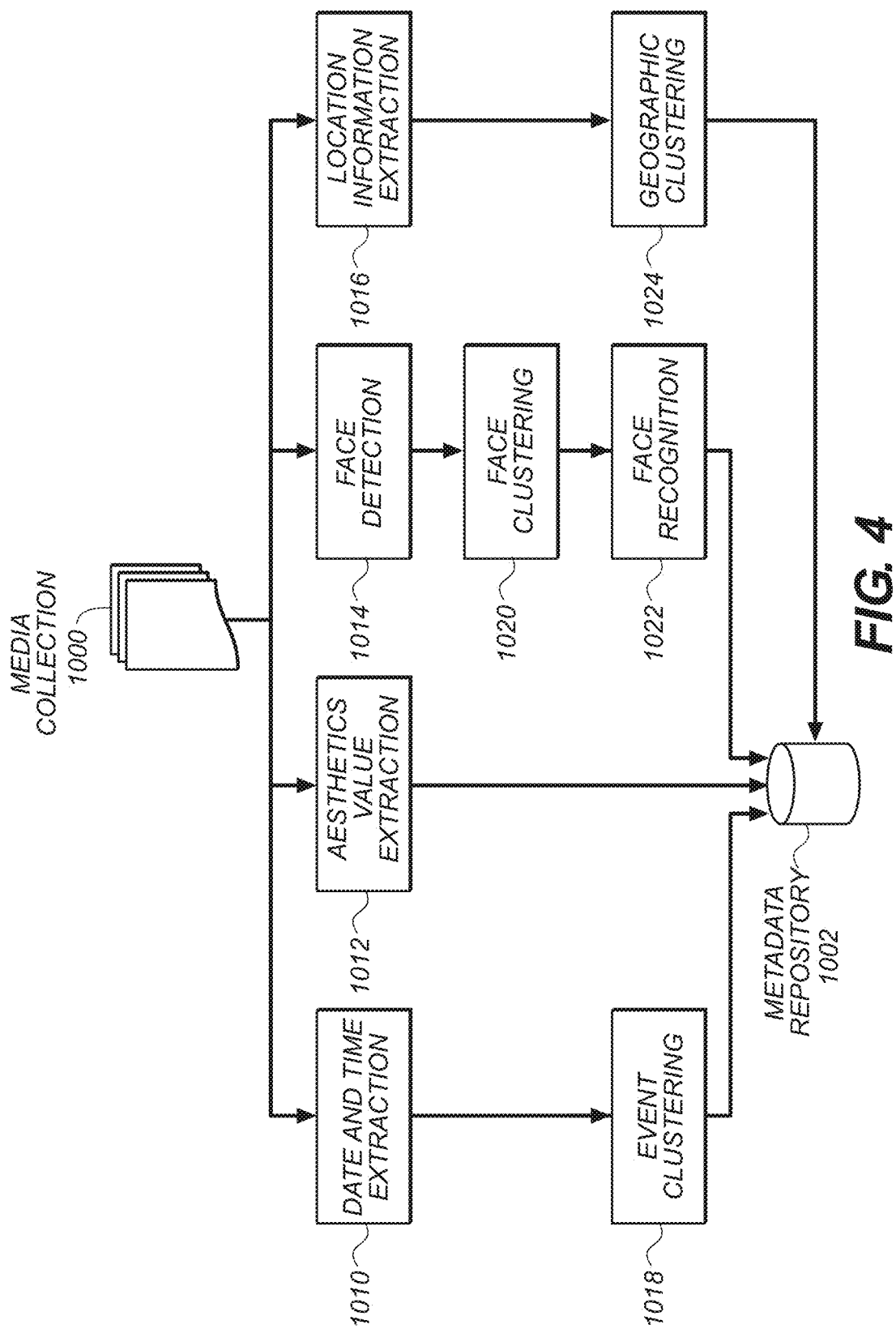
FIG. 4 is a flow diagram illustrating steps of operations of the present invention.

FIG. 4 shows the steps involved in the media processing 1003 component that extracts metadata. Step 1010 involves date and time extraction from every image or video in the media collection 1000. Images or videos taken with digital cameras or camcorders typically have date and time information embedded in their file headers that are extracted. The date and time information from the entire collection is used to perform event clustering 1018. In the present invention, events are the basic units of user reliving experience. Semantically images or videos in an event are related in their content by time, place, people, or some combination of them. The present invention performs event-clustering based on visual and temporal information as described in U.S. Pat. No. 6,606,411 to Loui et al, entitled "Method for automatically classifying images into events". Briefly summarized, a collection of images is classified into one or more events determining one or more largest time differences of the collection of images based on time or date clustering of the images and separating the plurality of images into the events based on having one or more boundaries between events where one or more boundaries correspond to the one or more largest time differences. For each event, sub-events are determined (if any) by comparing the color histogram information of successive images.

The time, date, and event cluster information for media is stored in the metadata repository 1002. For each image or video in the media collection 1000, an aesthetic value or quality is computed in Step 1012 and stored in the metadata repository 1002. Aesthetic value or quality is a valuable determinant in deciding how much screen-time and how much in size and how prominent in position should be allotted to an image or video during the reliving experience component 1008. In an embodiment of the present invention, an image value index is computed for each image or video using a method described by Jiang, Loui, and Cerosaletti, "Automatic aesthetic value assessment in photographic images," in the proceedings of the 2010 IEEE International Conference on Multimedia and Expo (ICME).

Another important metadata extracted from media collection 1000 is information about people present in images or videos. In order to achieve this, the present invention performs a face detection step 1014. Face detection has been a very active research area in computer vision for several decades now. A method to detect faces in pictures is described within an object detection framework in the published article of Paul Viola and Michael Jones, "Rapid Object Detection using a Boosted Cascade of Simple Features", Proceedings of the International Conference on Computer Vision and Pattern Recognition, 2001. A preferred embodiment of the present invention uses the face detection method described in the above article for step 1014. The faces detected are used to perform face clustering in step 1020. The objective of this step is to group similar looking faces that belong to the same individual into one cluster to facilitate subsequent viewing if a viewer chooses to browse or relive images or videos of a particular individual. A face recognition step 1022 attaches specific name labels to face clusters identified in step 1020. This is performed by manual labeling of names with the help of a user (familiar with people in the collection) or by automatic methods based on machine learning such as described in the published article of He, Yan, Hu, Niyogi and Zhang, "Face recognition using Laplacianfaces", IEEE Transactions on Pattern Analysis and Machine Intelligence, 27(3), 2005. The present invention adopts the former approach for face recognition and labeling by proving a user-interface that permits a user to associate labels with faces that have been clustered for different individuals. Face labels and cluster information are stored in the metadata repository 1002.

Geographic location, if available with images or video, can provide another form of metadata helpful for media reliving. The geographic location of an image or video are in the form of latitude-longitude pair (recorded automatically at capture time or later manually by user placement of media on a geographic map) or in the form of descriptive country/city place names (provided by user). The location information extraction step 1016 extracts location information from images or videos whenever such information is available. A geographic clustering step 1024 is then performed to group closely taken (in location) images or video together. The present invention uses a mean-shift clustering based approach as described in the published article of Cao, Luo, Gallagher, Jin, Han, Huang, "A Worldwide Tourism Recommendation System Based on Geotagged Web Photos", Proceedings of the IEEE International Conference on Acoustics, Speech, and Signal Processing, 2010. In another embodiment of the present invention, descriptive country/city place names are extracted from user provided information (e.g., in the image file names, image folder names, or other image related tags).

The location and geographic cluster information obtained from the media collection is stored in metadata repository 1002.

Figure 5:
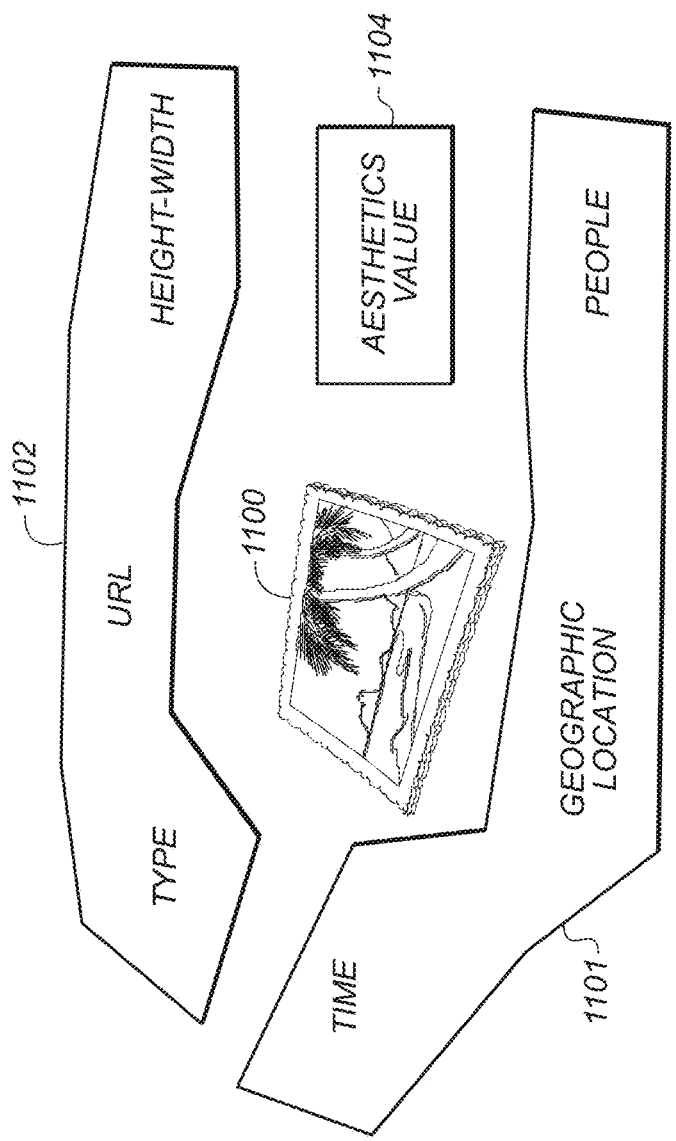
FIG. 5 is a block diagram showing a plurality of media metadata used in the present invention.

FIG. 5 depicts examples of media metadata that is related to each image or video 1100. In a preferred embodiment of the present invention, they fall into three categories including semantic media metadata 1101 (time, geographic location, people), generic media metadata 1102 (type, URL, height-width), and aesthetic value metadata 1104 (aesthetic value).

Figure 6:
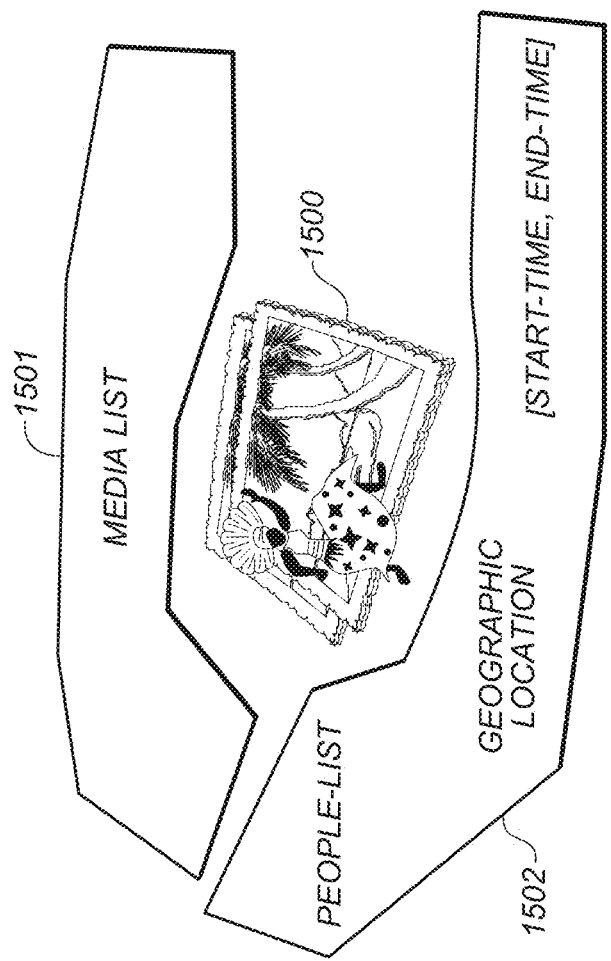
FIG. 6 is a block diagram showing a plurality of event metadata used in the present invention.

FIG. 6 depicts examples of event metadata that is related to each event 1500 that contain one or more images or videos. Recall that events are the basic units of user reliving experience in the present invention. In a preferred embodiment of the present invention, they fall into two categories including a media list 1501 (a list of images or videos in an event), and semantic event metadata 1502 (people list, geographic location, [start-time, end-time]).

Figure 7:
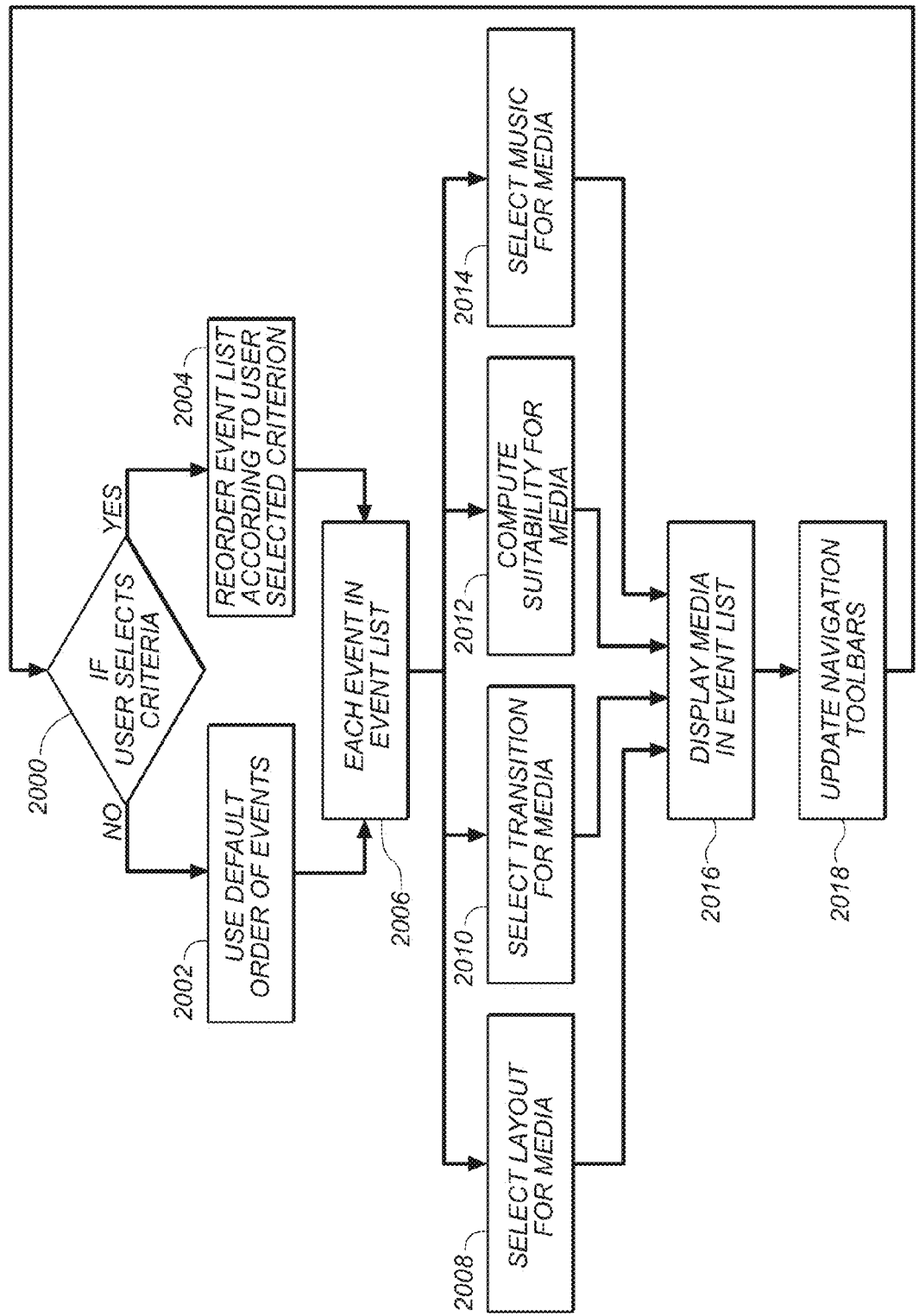
FIG. 7 is a block diagram showing operation steps involved in the media reliving experience component of the present invention.

FIG. 7 shows a block diagram of the operation steps involved in the media reliving experience component 1008 (FIG. 3) of the present invention. The present invention provides a user several criteria to control the reliving experience. In an embodiment of the present invention, the criteria correspond to 'time', 'location', 'people', and 'event'. For each criterion, a set of clickable icons are shown to the user to help make their choice. The 'time' criterion is displayed as bars for years and months (where the bar height corresponds to image or video capturing activity in the corresponding month or year). The 'location' criterion is displayed in the form of geographic clusters obtained in step 1024 (FIG. 4) during which the 'people' criterion is displayed as labeled faces from the collection (step 1022 in FIG. 4). A user-click on a particular icon triggers a reordering of the images or videos in the collection to honor the user selection (steps 2000 and 2004 in FIG. 7). If the user chooses not to click on any criterion but to passively experience the reliving show, a default order of events is used by the present invention (step 2002), or the current order of events is played out until further user actions. Each event 2006 in the event list contains corresponding images or videos, which will be displayed in a time-varying fashion with proper selection of layout, transition effect, suitability, and music in steps 2008-2014.

In the present invention, the reordering for the time criterion occurs based on the normalized time span difference between the user selected time stamp and start time of each event (which contains images or videos). The method selected for location based reordering is based on the normalized spatial difference between user-chosen-location and location of an event. For the 'people' criterion, the suitability of each event is computed based on a weighted average of the percentage of images that contain the person selected by the user, and the actual number of images with the person's face. Hence after sorting, events with many images of that person (both in ratio and absolute terms) show up at the top of the event tool bar.

This order of events computed in step 2004 dictate the order in which events are presented to the user. Alternatively, in step 2002, the order of events is computed with time selected as the default criterion. Each event contains images or video and presentation of an event corresponds to presentation of images or video in some fashion. The present invention computes a suitability score for each image or video in any given event (step 2012). This suitability score depends on the user selected criteria for reliving. If the criterion selected is 'time', or 'location', the present invention uses the aesthetics value (computed at step 1012 in FIG. 4) to score the image. If the criteria selected is 'person' (or a group of persons if the user chooses more than one person), a weighted average of multiple factors is computed as the suitability score wherein the factors include: chosen person's presence in the image or video, the relative size of the face in the image or video, the location of the face, the ratio of chosen person(s) to total number of persons present in that image. In another embodiment of the present invention, a pruning step is adopted to discard images that score below a threshold. This is useful to ensure that only images of the person selected (in person criteria) are displayed and getting rid of very poor quality images in other criteria. Otherwise, images or videos would be displayed in a descending order of the current user selected criterion without further user intervention.

Figure 8:
FIG. 8 is a pictorial illustration of example page layouts according to the present invention.

Step 2008 performs layout selection for the media to be displayed. Ideally the layout should be aesthetically pleasing and relevant to show the media (images or video) in a given event. In an embodiment of the present invention, page layouts with two (3000), three (3002), four (3004) or five (3006) images are pre-designed, as shown in FIG. 8. For a given event, a layout is selected such that the number of images or video shown is a direct multiple of the total number of images or videos in the event.

Figure 9:
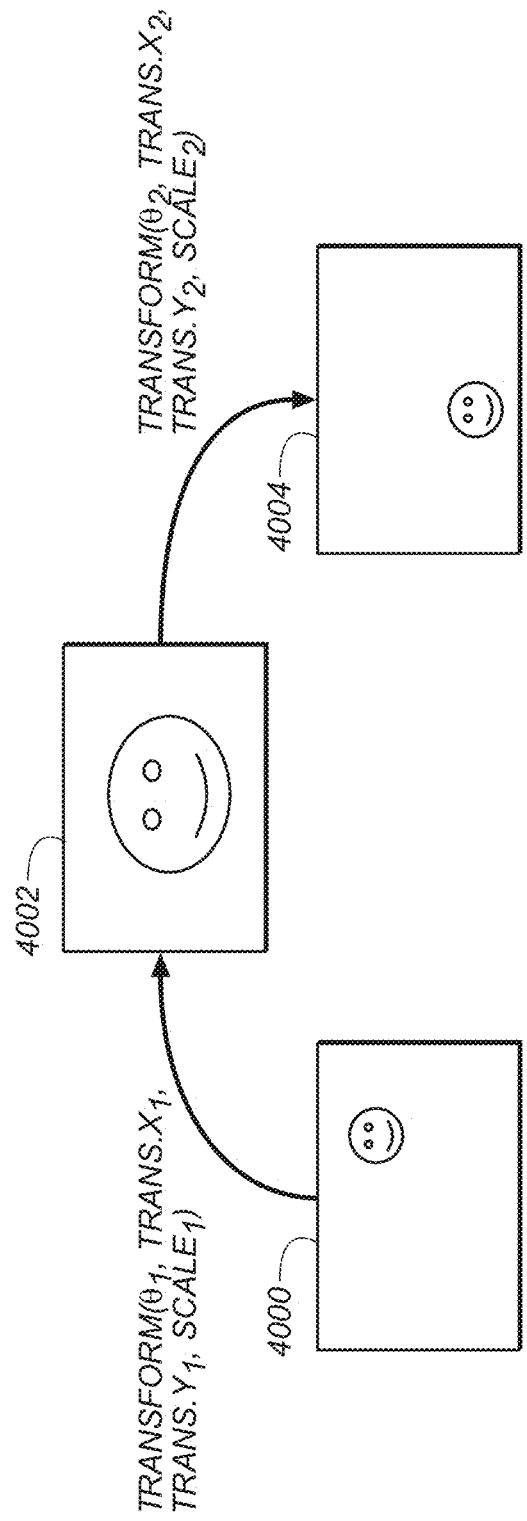
FIG. 9 is a block diagram showing transforms needed for transition from one photo to another photo according to faces in the photos.

If the number of images or videos in an event is greater than the number of images or videos permitted by a layout selected at step 2008, they cannot be displayed in one step. The present invention provides for a dynamic transition between outgoing and incoming images of videos. Step 2010 performs transition selection for the media to be displayed. In the present invention, the transitions for 'time' and 'location' criteria are 'slide in' and 'slide out' of the screen. For the 'people' criteria, the present invention performs a semantically more meaningful transition that provides the effect of the person's face being used as a 'wormhole' to move on from one image or video to another. As shown in FIG. 9, an affine transformation (rotation, translation, and scale) is computed to move the face in the current image or video 4000 into a predefined size-orientation intermediate frame 4002. At the same time a transformation to move from the intermediate frame 4002 according to the face in the next image 4004 is also computed. When both these transformations are applied in tandem as a smooth transition, such a transition produces the abovementioned face-to-face transition effect.

In the meantime, step 2014 selects semantically meaningful music to accompany the media to be displayed. The music accompanying the media is selected based on the current user criterion chosen at step 2000 that drives the time-varying display of the media. The music reflects the user criterion in content or genre. In one embodiment of the present invention, for the 'time' criteria, music is selected based on the season (e.g. music for seasons spring, summer, autumn, winter) of the event; for criteria 'people', music is selected based on generation (and gender if applicable) of the person(s) selected (e.g. music for the generation of Baby-boomers and generations X, Y, and Z); for criteria 'location' an embodiment of the present invention searches into a database of geolocation-characteristic songs and chooses the music that is closest of the location of the event. A database of geolocated music is constructed by manually searching for music in a location annotated music database and selecting songs for popular tourist destination locations.

After computing the suitability, layout, transition, and the accompanying music for media, step 2016 displays the images or video one event at a time. The images or video are granted screen time based on their suitability score (computed at step 2012). In the present invention, images or video are displayed in a purely temporal order so as to present a clear temporal flow to the user who is reliving the media collection. At times, the orientation of the images or video (landscape or portrait) might not match with the screen space allotted to them (based on the layout selected in step 2008). In order to resolve this issue, the present invention performs auto-zoom-crop to maintain semantic content. For the criteria 'people', the auto-zoom-crop attempts to preserve the chosen person's face. If the criterion is not 'people' and images or video contain faces, auto-zoom-crop attempts to preserve faces that are found. If no faces are found in images or video, auto-zoom-crop attempts to conserve the center portion of the image by sacrificing the outer parts. In order to avoid the problem of having multiple images or video transitioning out of the screen at the same time (and leaving large blank screen space), the present invention implements a simple token passing scheme between different holes, which permits only one image or video frame/hole to be outside the screen at a given time.

In step 2018, the navigation toolbars are updated based on the content of the displayed event. In the present invention, the 'time' browsing toolbar remains constant and permits users to switch to any time instance, except the month or year of the current event is highlighted to give the user a sense when in time she is. The 'people' toolbar shows people relevant to the displayed event. The 'location' toolbar shows locations of nearby events. In one embodiment of the present invention, the 'people' and 'location' toolbars also contain certain slots that, if requested, are filled by people or location randomly chosen from the user collection. The rationale behind this randomization is to permit the user to take a random leap in the reliving experience if she gets bored with the current selection. The present invention also contains a toolbar which gives preview of current and next few events by showing a sample image or video of the event as a representative thumbnail and giving (mouse-over) details of the event type and number of images or video in them.

The present invention also permits users to control the speed, and flow of the reliving experience at any time by adjusting the temporal display speed as well as an options to pause the slide show or go back to the previous event.

The present invention also permits storing the time-varying display of images or videos in the collection in a processor accessible memory. Furthermore, the stored time-varying display of images or videos are used to produce a movie, photo pages, or a photo book.

It is to be understood that the exemplary embodiments disclosed herein are merely illustrative of the present invention and that many variations of the above-described embodiments can be devised by one skilled in the art without departing from the scope of the invention. It is therefore intended that such variations be included within the scope of the following claims and their equivalents.

PARTS LIST

100 System
110 Data processing system
120 Peripheral system
130 User interface system
140 Processor-accessible memory system
200 Center media display area
201 "Places" navigation tool bar
202 "People" navigation tool bar
203 "Time" navigation tool bar
204 "Event" navigation tool bar
1000 Media collection
1002 Metadata repository
1003 Media processing component
1004 Combination component 1006 User interaction component
1008 Reliving experience component
1010 Date and time extraction step
1012 Aesthetics value extraction step
1014 Face detection step
1016 Location information extraction step
1018 Event clustering step
1020 Face clustering step
1022 Face recognition step
1024 Geographic clustering step
1100 Media (an image or video)
1101 Semantic media metadata
1102 Generic media metadata
1104 Aesthetic value metadata
1500 Event
1501 Media list
1502 Semantic event metadata
2000 User selection step
2002 Use default order of events step
2004 Reorder event list according to user selected criterion step
2006 Each event in event list
2008 Select layout for media step
2010 Select transition for media step
2012 Compute suitability for media step
2014 Select music for media step
2016 Display media in event list step
2018 Update navigation toolbars
3000 Two-image page layout
3002 Three-image page layout
3004 Four-image page layout
3006 Five-image page layout
4000 Current image with a face
4002 Intermediate image with a face
4004 Next image with a face

The invention claimed is:

1. A method for interactively viewing a collection of images, comprising:
displaying on a user-interface system one or more images of the collection in an initial time-variable sequence along with one or more icons, wherein each of the icons corresponds to a criterion for reordering the time-variable sequence;
reordering the time-variable sequence in response to a user selection of an icon;
computing a suitability score for each image in the collection of images, wherein suitability score depends at least on the criterion corresponding to the icon selected by the user;
restricting any low-suitability images from being displayed in the reordered time-variable sequence, wherein a low-suitability image is an image in the collection with a suitability score below a predetermined threshold; and
displaying on the user-interface system one or more images of the collection according to the reordered time-variable sequence along with one or more icons.

2. The method of claim 1 wherein the collection of images includes digital still images, digital audio files, digital video files, or frames of a digital video.

3. The method of claim 1 wherein the step of displaying the one or more images of the collection in an initial time-variable sequence continues until a user selects an icon.

4. The method of claim 1 further comprising the steps of:
analyzing the collection of images to determine properties of the images;
using the determined properties to produce the one or more icons; and
ordering the initial time-variable sequence according to a predetermined property.

5. The method of claim 1 wherein the reordering is also responsive to prior user selections.

6. The method of claim 1 further including storing in a processor accessible memory the display of the one or more images of the collection according to the initial and reordered time-variable sequence.

7. The method of claim 6 wherein the stored display of the one or more images is used to produce a movie, photo pages, or a photo book.

8. The method of claim 6 wherein the stored display of the one or more images is transmitted over a communication network.

9. The method of claim 1 wherein the display of the one or more images in the collection according to both the initial time-variable sequence and the reordered time-variable sequence is presented as page layouts of images or videos with transition effects.

10. The method of claim 1 wherein the display of the one or more images in the collection according to the reordered time-variable sequence is presented with accompanying music responsive to the user selection of the icon.

11. The method of claim 1 wherein the criteria to which the one or more icons correspond comprises:
the places where the images in the collection have been taken;
the people who are present in the images in the collection;
the date and time information when the images in the collection were captured; and
the events captured by the images in the collection.

* * * * *